J. MERCKENS & A. J. HERRICK.
CALL REGISTER FOR TELEPHONES.
APPLICATION FILED DEC. 19, 1904.

953,344.

Patented Mar. 29, 1910.

Witnesses:

Inventors,
John Merckens
Anton J. Herrick
By Offield Towle & Linthicum
Attys.

J. MERCKENS & A. J. HERRICK.
CALL REGISTER FOR TELEPHONES.
APPLICATION FILED DEC. 19, 1904.

953,344.

Patented Mar. 29, 1910.
5 SHEETS—SHEET 2.

Witnesses,
Inventors,
John Merckens
Anton J. Herrick,
By Offield Towle & Linthicum
Attys.

J. MERCKENS & A. J. HERRICK.
CALL REGISTER FOR TELEPHONES.
APPLICATION FILED DEC. 19, 1904.

953,344.

Patented Mar. 29, 1910.
5 SHEETS—SHEET 4.

Witnesses,

Inventors,
John Merckens
Anton J. Herrick
By Offield Towle & Linthicum
Attys.

J. MERCKENS & A. J. HERRICK.
CALL REGISTER FOR TELEPHONES.
APPLICATION FILED DEC. 19, 1904.

953,344.

Patented Mar. 29, 1910.
5 SHEETS—SHEET 5.

UNITED STATES PATENT OFFICE.

JOHN MERCKENS AND ANTON J. HERRICK, OF CHICAGO, ILLINOIS, ASSIGNORS TO JAMES E. PLEW, OF CHICAGO, ILLINOIS.

CALL-REGISTER FOR TELEPHONES.

953,344.

Specification of Letters Patent.   Patented Mar. 29, 1910.

Application filed December 19, 1904. Serial No. 237,549.

*To all whom it may concern:*

Be it known that we, JOHN MERCKENS and ANTON J. HERRICK, citizens of the United States, residing at Chicago, in the county of Cook and State of Illinois, have invented certain new and useful Improvements in Call-Registers for Telephones, of which the following is a specification.

This invention relates to improvements in call registers for telephones and it has for its salient objects to provide a simple, reliable register provided with accessories which enables the exchange operator to compel the recording of a call upon the register before giving the desired connection; to provide in such a register means whereby the counter may be set back by a coöperative action of the exchange operator and the subscriber, when for any reason the call proves ineffectual and it is desired to credit back a tally theretofore recorded; to provide in such a register improved means for effecting a reading of the tallies recorded thereon and transmission of the same electrically to a distant station; to provide for thus reading the register without disturbing the positions of the counters or destroying the record set up upon the register; to so construct and arrange the several features of the device that the mechanical power necessary to actuate the register in performing its various functions is practically all furnished manually by the subscriber, while nevertheless controlled by the exchange operator electrically; to provide various safeguarding features which contribute to the reliability and freedom from tampering of the register; and in general to provide a simplified and improved device of the character referred to.

To the above ends the invention consists in the matters hereinafter described, and more particularly pointed out in the appended claims.

The invention will be readily understood from the following description, reference being had to the accompanying drawings forming a part thereof and in which—

Figure 8:
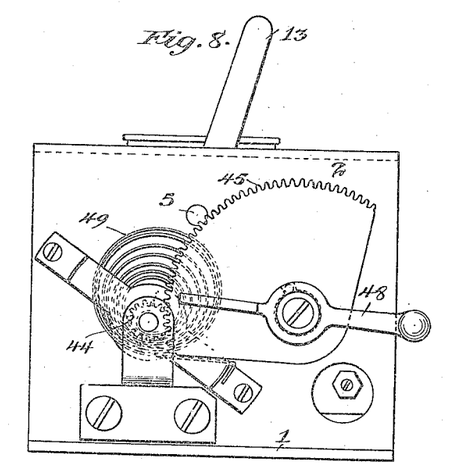
Fig. 8 is an end elevation of the opposite end of the machine.
Figures 11, 12:
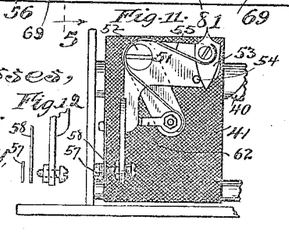
Fig. 11 is a detail side elevational view of the traveler.
Fig. 12 is a detail view of the spring contacts carried by the traveler.
Figure 13:
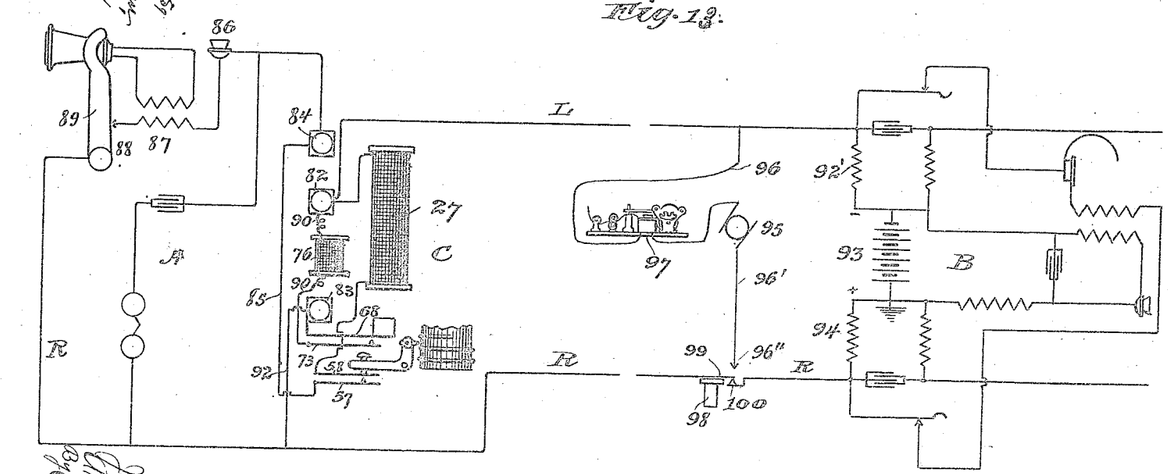
Fig. 13 is a diagrammatic view showing the electrical connections.

Referring to the drawings, 1 designates a base frame plate, 2 a top frame plate, and 3 and 4, respectively, end frame plates; the latter being conveniently formed integrally with the top plate. A main shaft 5 (see Figs. 4 and 8) is mounted to extend from one end plate to the other and upon this main shaft are journaled a series of counter wheels 6, 7, 8 and 9, which are interconnected in any usual manner so as to transfer from one denomination to the next higher denomination and are also provided upon their exteriors with circumferentially extending ribs 10 of varying length and constituting contact actuating projections whose function is to coöperate with a transmitter mechanism in effecting a reading of the register.

Figure 2:
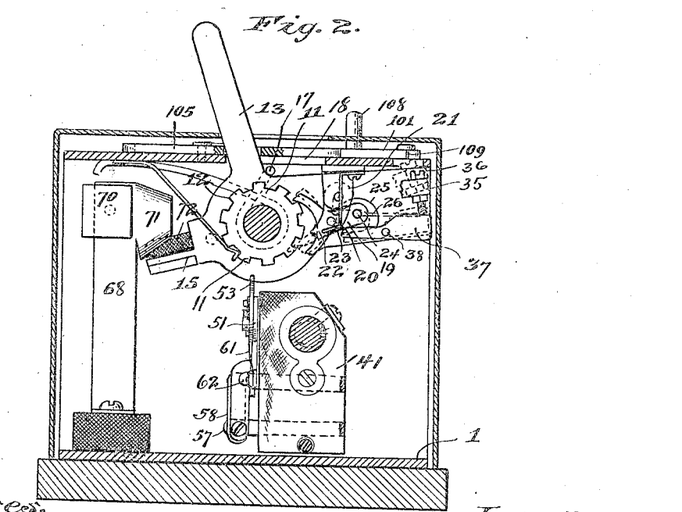
Fig. 2 is a cross sectional view taken approximately on the line 2—2 of Fig. 4 and looking in the direction of the arrows.
Figures 5, 6, 9, 10:
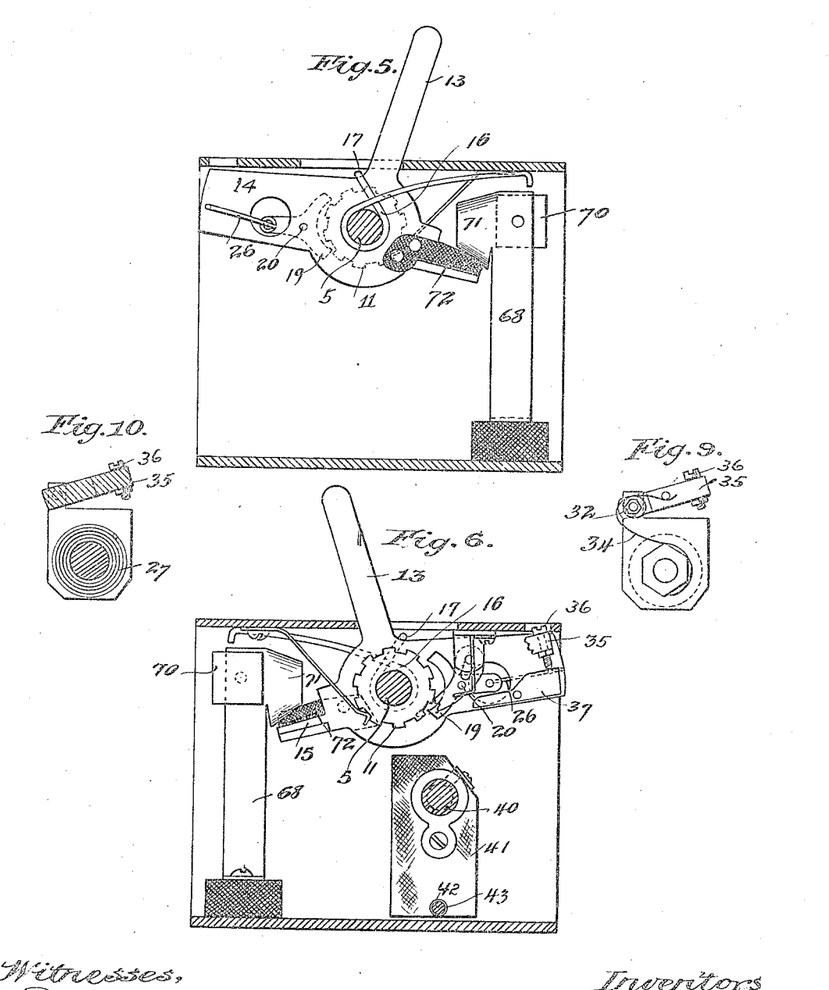
Fig. 5 a transverse sectional view taken on line 5—5 of Fig. 4 with certain parts omitted.
Fig. 6 is a sectional view similar to Fig. 2 but showing the parts in changed position.
Fig. 9 is an end view of the pawl controlling relay.
Fig. 10 is a cross sectional view of the same taken through the body of the magnet spool.

The units counter 6 is provided with a duplex ratchet wheel 11 having two series of teeth 12 and 12' arranged in staggered relation to each other and integrally or otherwise rigidly united. Upon the main shaft adjacent to the outer end of the said ratchet wheel is pivoted a tally lever 13, which tally lever, as best seen in Figs. 2, 5 and 6, is provided inside of the casing with a front extension 14 and a rear extension 15. A coil spring 16 has one end 17 connected with the tally lever and its opposite end arranged to bear against a fixed part of the casing; the tension of said spring tending to hold the tally lever in a rearwardly inclined position, and the top casing being slotted as indicated at 18 to permit a limited oscillation of the lever. Upon the front extension 14 of the tally lever is pivotally mounted, as at 20, a Y-shaped reversing pawl 19 adapted to move the ratchet wheel 11 either forwardly or rearwardly, depending upon the position of said pawl, both engaging ends of the pawl 19 act upon the series ratchet teeth 12. Upon a lug 21, depending from the top frame plate, is pivotally mounted a retaining pawl 22 which normally engages the teeth 12' and prevents the units counter from being turned rearwardly.

The retaining pawl is slotted at its point of engagement with the pivot stud so that it is capable of being shifted backwardly a distance equal to one ratchet tooth, as seen clearly in Fig. 6 and said pawl is normally held in its projected position and in bearing with the ratchet wheel by means of a spring 23. The reversing pawl 19 is provided at its rear end with a stud 24 which works through an opening 25 formed in the rear extension 14 of the tally lever and an expansion spring 26 connected with said stud 24, and the outer end of the extension 14 acts upon said pawl to force either arm of the latter into engagement with the ratchet wheel, depending upon which way the pawl is shifted. Normally the pawl occupies the position seen in Fig. 6.

Figure 3:
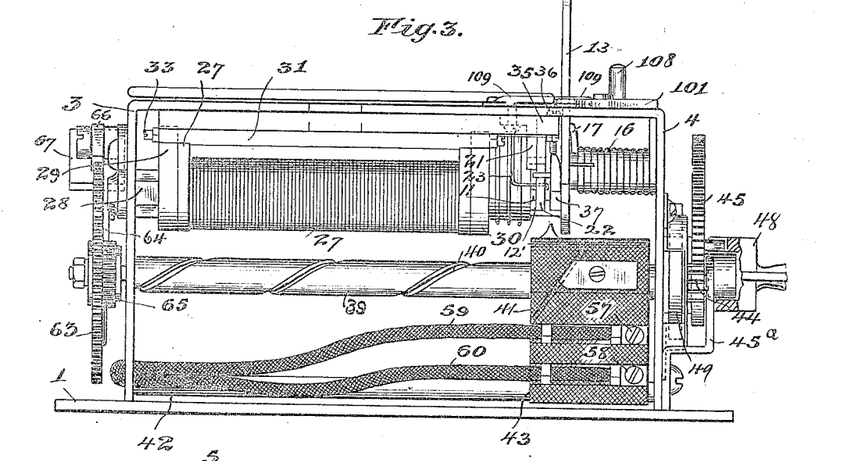
Fig. 3 is a front elevation.

In order to effect a reversal of the pawl for the purpose of setting back the units counter upon the tally, mechanism is provided as follows: Referring to Fig. 3, 27 designates as a whole a relay, the core of which is provided with a brass extension 28 which extends through and is rigidly secured to the end plate 3 so as to sustain the relay in horizontal position. The relay or magnet is provided at each end with pole pieces as 29, 30, which have flattened edges adapted to coöperate with an armature 31, as best seen in detail Figs. 9 and 10. The pole pieces are provided at their rear edges with upright extensions 32 to which the rear edge of the armature is pivoted by means of pivot studs 33; it being understood that the pivotal axis of the armature is parallel with the longitudinal axis of the magnet. The armature is normally held retracted by means of a V-spring 34. At one end the armature is provided with an extension 35 through which is adjustably threaded a tappet screw 36.

Referring again to Fig. 2, 37 designates a shifting lever pivotally mounted between its ends as at 38 upon the front extension 14 of the tally lever; the forward end of said shifting lever being engaged by the tappet screw when the armature is turned down, thereby oscillating the lever and forcing its other end into engagement with the reversing pawl at a point radially outside of the pivot of the latter. Obviously energizing the relay 27 will thus effect the reversing of the position of the pawl 19 so as to cause it to act upon the return stroke of the tally lever and thus turn the units counter backwardly instead of forwardly. Whenever the units counter is turned backwardly it will be obvious that the retaining pawl 22 will be shifted backwardly upon its slotted pivot support, and this retraction of the retaining pawl is made to serve in effecting the reversal of the reversing pawl back to its normal position. To this end, the stud 24 of the reversing pawl is extended inwardly into the plane of the retaining pawl and the heel portion of the latter is so shifted as to form a shoulder, which, when the retaining pawl is retracted, is brought into the path of the said stud 24 and engages the latter as the tally lever returns to its normal rearward position. The engagement of said stud with the heel of the retaining pawl positively forces the reversing pawl back into its normal forwardly operating position. It follows that the units counter can be set back only one tally at a time since it is necessary for the relay to be energized to place the pawl in position for setting back, and the operation of the tally lever automatically and inevitably restores the pawl to its normal position upon the first operation. The energizing of the relay is accomplished by the central exchange, as will hereinafter appear.

Figure 4:
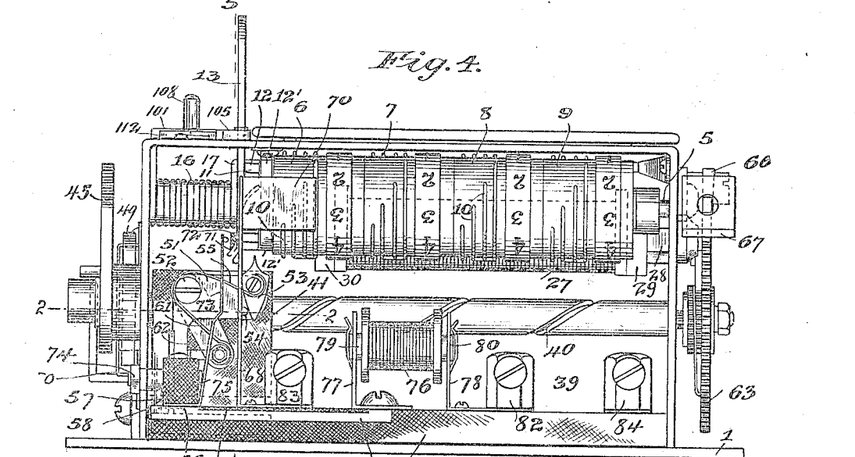
Fig. 4 is a rear elevation.

The reading and transmitting mechanism is constructed and arranged as follows: Referring to Figs. 3 and 4, 39 designates a shaft having its ends journaled in the end frame plates and arranged to extend parallel with the series of counter wheels but spaced at some distance therefrom. The shaft 39 is provided with a spiral groove 40 and upon the shaft is arranged to slide a traveler designated as a whole 41 and comprising a main block of insulating material through which extends a metal bushing having a thread projection engaging the spiral groove 40 of the shaft. The traveler is held against rotation by means of a guide rod 42 (see Fig. 6) mounted to extend parallel with the shaft 39 and engaging a suitable groove 43 formed to extend through the traveler. When thus constructed and arranged it will be obvious that rotation of the shaft 39 will impart a positive traveling movement to the traveler, depending upon which way the shaft is turned. In order to rotate the groove shaft, the latter is provided at one end with a pinion 44, and with this pinion is intergeared a gear segment 45 which is journaled on a suitable stop shaft 46 carried by the end plate 4, and is provided with a crank socket 47 to which is detachably attached a crank 48 shown in detail Fig. 8. The spiral groove shaft is rotated by the crank in one direction and returned by a spiral clock spring 49 coiled around the shaft just outside of the end plate 4 and confined within a strap plate 50, it being understood that the inner end of the spring is attached to the shaft while the outer end is connected to a suitable support, as for example the strap 50. The journal of the pinion 44 is supported by a bracket 45ª.

The traveler carries a contact mechanism adapted to coöperate with the ribs 10 of the counter wheels to make a break in electric circuit. Describing said mechanism and referring to Fig. 4, 51 designates an angle lever pivoted at its angle to the transmitter block as indicated at 52 and carrying at the end of one arm a vibratory contact device 53 which is held rigid against oscillation beyond a certain position in one direction by means of a stop pin 54. A spring 55 holds the contact device yieldingly against the stop 54. The opposite arm of the lever 51 extends downwardly and carries an adjustable contact screw 56 which coöperates with a pair of spring contact strips 57 and 58, likewise mounted upon the transmitter block and projecting outwardly therefrom within range of the vibratory arm of the lever 51. These contact strips 57 and 58 are insulated from each other and tend to normally stand apart or in open circuit position. With the respective strips 57 and 58 are connected flexible conducting wires 59 and 60 which extend thence out through the end plate 3; it being understood that these conductors are of sufficient length to permit free movement of the traveling back and forth. The angle lever 51 is normally held retracted away from the contact strips 57 and 58 by means of a spring 61; the extent of movement of the lever under the action of the spring being limited by the stop 62.

Figure 7:
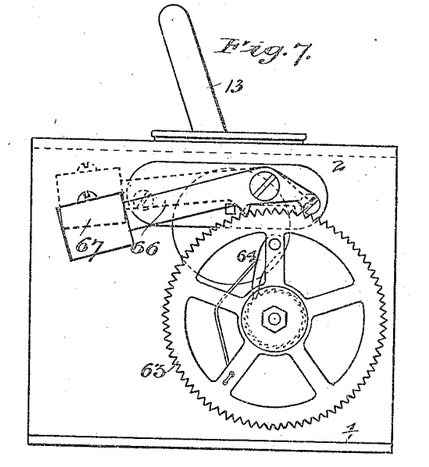
Fig. 7 is a left hand end elevation of the machine as seen in Fig. 3.

In order to prevent the too abrupt return of the traveler under the action of the clock spring acting upon the spiral shaft, a retarding device is provided consisting of an escapement wheel 63 loosely mounted upon the right-hand end of the spiral shaft and carrying a spring pawl 64 which engages a ratchet wheel 65 fast upon said shaft adjacent to the escapement wheel. Adjacent to the periphery of the escapement wheel (see Fig. 7) is pivotally mounted an escapement lever 66 carrying at its free end an adjustable weight 67 whereby the rate of vibration of the lever may be regulated.

In order that the exchange operator may determine when the tally lever has been operated to record a tally, a buzzer is provided which is connected in circuit with the telephone line, this buzzer being of an improved and novel construction. Describing the device, and referring to Fig. 4, 68 designates an upstanding plate spring secured to an insulating strip 69 upon the base of the register and carrying at its upper end a weight block 70. The strip 68 stands in vertical register with the rear extension 15 of the tally lever (see Figs. 2 and 6) and said extension is formed into a cam finger which coöperates with a blade switch cam 71 formed upon the proximate edge of said spring strip. The arrangement is such that upon the forward stroke of the tally lever the cam is engaged, the strip bent out of its normal plane and released suddenly so as to impart a vibratory motion to the weighted strip. Upon the return motion of the lever the cam finger passes on the opposite side of the cam, and a damper finger 72 carried by the extension 15 instantly arrests the vibration of the strip. Adjacent to one side of the strip 68 is mounted a second upstanding spring contact strip 73 which is made light and extremely flexible so as to retard the vibrations of the weighted strip but slightly, and is adapted to close contact with the latter as long as it continues in pronounced vibration. An adjusting screw 74 threaded through an insulating block 75 provides for regulating the distance of the strip 73 from the weighted strip 68.

76 designates a small resistance coil or spool mounted between a pair of metallic standards 77 and 78 upon the insulating strip 69. The ends of the windings of this spool are respectively connected with metallic hubs 79 and 80 which are in metallic connection with the standards 77 and 78, respectively. The standard 77 is electrically connected with the contact strip 73 by means of a metallic strip 81, and similarly the standard 77 is electrically connected with a binding post 82. A similar binding post 83 is connected with the weighted spring strip 68, and a third binding post 84 is mounted upon the insulating strip 69 for the purpose of making circuit connections, as will hereinafter appear.

Describing now the circuit connections which may be employed when the instrument is connected with the subscriber's telephone, and referring to diagrammatic Fig. 14, "A" designates as a whole the subscriber's usual set, shown diagrammatically, "B" so much of a central exchange station as is necessary to understand the invention, and "C" the register; the latter being shown partly diagrammatically and partly in mechanical form. "L" and "R" designate the usual left and right hand main lines leading from the subscriber's station to "central." At the subscriber's station the left-hand main line is connected to binding post 82 and thence passes serially through the relay or magnet 27, thence to the spring contact strip 58 which coöperates with contact strip 57; the line being normally closed at this point. From contact strip 57 a conductor 85 leads to the binding post 84 and thence to the transmitter 86, thence through the primary 87 to the back contact 88 which coöperates with the switch-hook 89. The right main line is connected direct to the switch-hook. The buzzer is connected to the main lines in bridging or shunt relation, this circuit being traced as follows: From the binding post 82 a conductor 90 leads to and through the buzzer coil 76, and thence to the contact strip 73 where the current is normally interrupted. The coöperating weighted strip 68 is connected with binding post 83, and from the latter a conductor 92 leads to the right-main line thus completing the shunt.

At the central station the circuit connections are from left main line through a resistance 92′ to battery 93, and from the latter through a second resistance 94 back to the right main line. The battery 93 furnishes the usual talking current. The relay 27 of the subscriber's register is responsive only to a current which is heavier than the battery current and accordingly a second source of energy is arranged to be connected in bridged relation across the main lines at a point between the resistances 92 and 94 and the subscriber's station. This source of heavier current may be the ordinary 110 volt current, and is indicated diagrammatically at 95 as interposed in a bridging conductor 96, one side of which is connected permanently to the left main line, leads thence through any suitable recording or responsive device, an ordinary Morse recorder being indicated at 97, and from thence to the generator 95. The opposite side 96′ terminates in a contact 96″. A push button 98 is arranged to act upon a spring contact 99 so as to open the right main line at a back contact 100 and close the bridged line 96 through the subscriber's set when a reading of the register is to be taken.

The operation of the system is probably entirely obvious from the foregoing description but may be briefly summarized as follows: Normally the traveler 41 is held retracted by the clock spring acting on the spiral shaft, and in this retracted position forces the spring contacts 57 and 58 together so as to maintain the line closed at this point. The circuit is, however, as usual, open at the switch-hook so that when the subscriber removes his receiver and thus completes the circuit the drop or other annunciator is operated at "central." When "central" responds the subscriber asks for the number wanted as usual, whereupon "central," finding that the called subscriber's line is free, requests the calling subscriber to register, which he does by pulling forward the tally lever of his register, thus throwing the buzzer into vibration and creating a line disturbance which "central" hears. Thereupon she gives him the connection desired. Ordinarily this is the complete operation of tallying. However, it occasionally happens that the operator at "central" has given the wrong number to the subscriber, or possibly he has made a mistake in asking the number, and it is desired to credit back the tally which was recorded in thus securing the connection. Thereupon when he requests "central" to rebate the tally, she presses the push button 98 thus throwing the heavier current through the relay 27 momentarily and thereby reversing the position of the reversing pawl 19. She then instructs the subscriber to again operate the tally lever, and in so doing he sets back the register one tally and again operates the buzzer, thus announcing to "central" that he has complied.

The operation of taking a reading of the subscriber's register is as follows: The exchange operator calls up the subscriber, informs him that a reading is to be taken, and requests him to pull forwardly the crank handle which operates the traveler. As the crank-handle is turned forwardly the traveler is forced along the spiral shaft and the clock-spring wound up correspondingly. As the traveler performs its outward traverse, the vibratory contact device 53 oscillates idly, or, in other words, without moving the angle lever, because in the outward movement of the traveler the contact device is oscillated in a direction away from the stop 54. Accordingly the main circuit while opened as soon as the traveler starts is not again closed until the traveler commences to make its return movement, and in so doing engages the first of the ribs 10 which happens to be in alinement with the contact device 53. During the return each rib encountered oscillates the contact 53, and in so doing oscillates the angle lever, thus closing the circuit at the contacts 57, 58. This alternate opening and closing of the circuit operates the responsive device at "central" and thus transmits the reading without destroying the position of the register.

Figure 1:
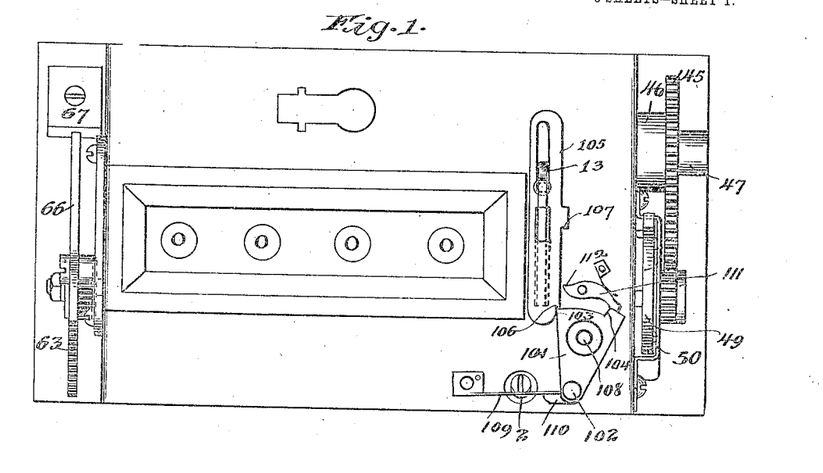
Figure 1 is a top plan view of a register embodying the invention, the outer casing being removed to expose the mechanism.

As a further auxiliary feature of improvement which contributes to the accurate operation of the register and prevents accidental or unpremeditated tampering with the tally-lever, we provide mechanism as follows: Referring to Fig. 1, 101 designates an oscillatory lever pivoted to the top frame plate of the machine, as indicated at 102, and having its free end formed into segmental shape and provided with two shoulders 103 and 104, respectively. 105 designates an escutcheon plate mounted to slide upon the surface of the top frame plate and move with the tally-lever 13, the latter projecting through an opening in said escutcheon plate. Said escutcheon plate is provided with two shoulders designated 106 and 107, respectively, the first of which is normally engaged by the shoulder 103 of the oscillatory lever and the plate thus held against movement, together with the lever. The lever is provided with a finger pin 108 working through a slot in the outer top casing whereby the lever may be retracted out of the path of the escutcheon plate, against the tension of a plate spring 109 which is arranged to act upon a heel projection 110 formed upon the lever. A spring-pressed detent 111 is pivotally mounted adjacent to the free end of the lever 101 and when the latter is retracted drops into engagement with the shoulder 104 and thus holds it retracted. When the tally-lever is depressed the shoulder 107 of the escutcheon plate engages the heel 112 of the detent, lifts the latter out of engagement with the shoulder 104 and allows the oscillatory lever to be thrown into engagement with the side of the escutcheon plate, and upon the return of the escutcheon plate to its normal position it is again locked against movement.

While we have herein shown and described a practical and preferred embodiment of our present invention yet it will be understood that the details thereof, and especially the circuit connections, may be modified or changed without in any wise departing from the invention. Accordingly we do not limit ourselves to these details except to the extent that they are made the subject of specific claims.

We claim as our invention:

1. A tally register for telephone calls and the like comprising a suitable main frame, one or more counter members movably mounted therein, a manually operable tally member for actuating said counter, and a traveling transmitter mechanism for effecting a factual reading of the counter comprising a shaft, a traveler mounted upon and having screw threaded connection with said shaft, a wiping contact device carried by said traveler, contact projections upon the counter member or members adapted to coöperate with said wiping contact, an electric circuit controlled by said wiping contact, means for holding the traveler against rotation during its traversing movement, and means for rotating the shaft carrying said traveler in both directions, comprising a handle operatively connected with the shaft for rotating it in one direction and a spring opposing the rotation of the shaft and operating to rotate it in the opposite direction.

2. In a tally register of the general character described, the combination with a suitable main frame, of a series of denominational counters rotatably mounted therein in axial alinement with each other, each counter wheel being provided with contact projections, means for actuating the units counter step by step, carrying connections between the units counter and successive counters, and a transmitter mechanism comprising a rotatable shaft journaled to extend alongside of the series of counters, a traveler having screw threaded engagement with said shaft, a spring-pressed vibratory contact arm mounted upon said traveler and adapted to coöperate with said counter wheels, an electric circuit controlled by contacts actuated by said spring-pressed arm, a manually operable handle operatively connected with said shaft for rotating the same, a motor spring likewise operatively connected with said shaft, and a retarding device intergeared with the shaft and operating to retard the rotation of the latter under the action of said spring.

3. In combination with a telephone system or analogous electric system, a tally register comprising a counter member, means for tallying thereon, and a set-back mechanism comprising a magnet operatively connected with the line circuit, operative connections between the armature of said magnet and a counter actuating member whereby the counter may be set back, and a manually operable member operatively connected with the said magnet-controlled member, for the purpose set forth.

4. In combination with a telephone system or analogous electric system, a tally register comprising a main frame, a counter wheel journaled therein, a manually operable tallying member whereby the counter wheel may be stepped forwardly, a magnet connected in circuit with the main line, a pawl arranged to act upon the counter wheel to set the latter back, operative connections between said pawl and the armature of the magnet, and operative connections between the counter engaging part of the manually operable tally device and the armature of said magnet.

5. In combination with a telephone circuit, a tally register comprising a main frame, a counter wheel journaled therein, a tally lever, a double arm reversing pawl operatively connected with said lever, and a magnet connected in circuit with the telephone line and operatively connected with said pawl to effect a reversal of the same.

6. In combination with a telephone system, a tally register comprising a main frame, a counter wheel journaled therein, a tally lever mounted adjacent to said counter wheel, a duplex ratchet connected with said counter wheel, a double arm reversing pawl pivotally mounted upon the tally lever, a magnet connected in circuit with a telephone line, operative connections between the armature of the magnet and reversing pawl, and means operating to automatically restore the reversing pawl to its normal forwardly acting position during a movement of the tally lever succeeding the set-back movement of the same and before the counter wheel can be again actuated thereby.

7. In combination with an electric circuit, a tally register comprising a counter wheel, a ratchet connected with the counter wheel, a manually operable member, a pair of pawls operatively connected with said manually operable member and adapted to actuate the counter wheel in opposite directions, a magnet, operative connections between the armature of the magnet and said pawls for effecting a reversal of the same, a detent shiftably mounted so as to be capable of a limited retarding movement, a ratchet connected with the counter upon which said detent operates, and coöperative connections between said detent and pawls whereby the setting-back of the counter wheel retracts the detent, and the retraction of the detent operates to reverse the pawls back to normal.

JOHN MERCKENS.
ANTON J. HERRICK.

Witnesses:
ALBERT N. GRAVES,
A. O. E. METZEL.